(12) United States Patent
Golden et al.

(10) Patent No.: US 8,104,162 B2
(45) Date of Patent: Jan. 31, 2012

(54) INSERT WITH FILLER TO DAMPEN VIBRATING COMPONENTS

(75) Inventors: Mark A. Golden, Washington, MI (US); John C. Ulicny, Oxford, MI (US); Michael D. Hanna, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 755 days.

(21) Appl. No.: 12/105,411

(22) Filed: Apr. 18, 2008

(65) Prior Publication Data

US 2009/0260939 A1 Oct. 22, 2009

(51) Int. Cl.
*B21B 1/46* (2006.01)
*F16F 11/00* (2006.01)

(52) U.S. Cl. ........................ 29/527.1; 188/381

(58) Field of Classification Search ............... 29/527.1, 29/527.2, 527.3, 428, 469; 188/381
See application file for complete search history.

(56) References Cited

U.S. PATENT DOCUMENTS

| | | | |
|---|---|---|---|
| 974,024 A | 10/1910 | Carter | |
| 1,484,421 A | 2/1924 | Thomspon | |
| 1,989,211 A | 1/1935 | Norton | |
| 2,012,838 A | 8/1935 | Tilden | |
| 2,026,878 A | 1/1936 | Farr | |
| 2,288,438 A | 6/1942 | Dach | |
| 2,603,316 A | 7/1952 | Pierce | |
| 2,978,793 A | 4/1961 | Lamson et al. | |
| 3,085,391 A | 4/1963 | Hatfield et al. | |
| 3,127,959 A | 4/1964 | Wengrowski | |
| 3,147,828 A | 9/1964 | Hunsaker | |
| 3,292,746 A | 12/1966 | Robinette | |
| 3,378,115 A | 4/1968 | Stephens, III | |
| 3,425,523 A | 2/1969 | Robinette | |
| 3,509,973 A | 5/1970 | Kimata | |
| 3,575,270 A | 4/1971 | Reinbek et al. | |
| 3,774,472 A | 11/1973 | Mitchell | |
| 3,841,448 A | 10/1974 | Norton, Jr. | |
| 3,975,894 A | 8/1976 | Suzuki | |
| 4,049,085 A | 9/1977 | Blunier | |
| 4,072,219 A | 2/1978 | Hahm et al. | |
| 4,195,713 A | 4/1980 | Hagbjer et al. | |
| 4,250,950 A | 2/1981 | Buxmann et al. | |
| 4,278,153 A | 7/1981 | Venkatu | |
| 4,338,758 A | 7/1982 | Hagbjer | |
| 4,379,501 A | 4/1983 | Hagiwara et al. | |
| 4,475,634 A | 10/1984 | Flaim et al. | |
| 4,523,666 A | 6/1985 | Murray | |

(Continued)

FOREIGN PATENT DOCUMENTS

CH 428319 A 1/1967

(Continued)

OTHER PUBLICATIONS

International Search Report for PCT/US2009/039839, Nov. 24, 2009, 3 pages.

(Continued)

*Primary Examiner* — John C Hong
(74) *Attorney, Agent, or Firm* — Reising Ethington P.C.

(57) ABSTRACT

An insert has a body which defines a cavity with a filler held in the cavity. Relative movement between the body and the filler helps dampen vibrations in a component when the insert is carried in the component and when the component is vibrated.

17 Claims, 2 Drawing Sheets

U.S. PATENT DOCUMENTS

| | | | |
|---|---|---|---|
| 4,529,079 A | 7/1985 | Albertson | |
| 4,905,299 A | 2/1990 | Ferraiuolo et al. | |
| 5,004,078 A | 4/1991 | Oono et al. | |
| 5,025,547 A | 6/1991 | Sheu et al. | |
| 5,083,643 A | 1/1992 | Hummel et al. | |
| 5,115,891 A | 5/1992 | Raitzer et al. | |
| 5,139,117 A | 8/1992 | Melinat | |
| 5,143,184 A | 9/1992 | Snyder et al. | |
| 5,183,632 A | 2/1993 | Kiuchi et al. | |
| 5,184,663 A | 2/1993 | Oono et al. | |
| 5,259,486 A | 11/1993 | Deane | |
| 5,310,025 A | 5/1994 | Anderson | |
| 5,416,962 A | 5/1995 | Passarella | |
| 5,417,313 A | 5/1995 | Matsuzaki et al. | |
| 5,509,510 A | 4/1996 | Ihm | |
| 5,530,213 A | 6/1996 | Hartsock et al. | |
| 5,582,231 A | 12/1996 | Siak et al. | |
| 5,620,042 A | 4/1997 | Ihm | |
| 5,653,169 A * | 8/1997 | Puschnerat et al. | 101/415.1 |
| 5,660,251 A | 8/1997 | Nishizawa et al. | |
| 5,789,066 A | 8/1998 | DeMare et al. | |
| 5,819,882 A | 10/1998 | Reynolds et al. | |
| 5,855,257 A | 1/1999 | Wickert et al. | |
| 5,862,892 A | 1/1999 | Conley | |
| 5,878,843 A | 3/1999 | Saum | |
| 5,927,447 A | 7/1999 | Dickerson | |
| 5,965,249 A | 10/1999 | Sutton et al. | |
| 6,047,794 A | 4/2000 | Nishizawa | |
| 6,073,735 A | 6/2000 | Botsch et al. | |
| 6,112,865 A | 9/2000 | Wickert et al. | |
| 6,206,150 B1 | 3/2001 | Hill | |
| 6,216,827 B1 | 4/2001 | Ichiba et al. | |
| 6,223,866 B1 | 5/2001 | Giacomazza | |
| 6,231,456 B1 | 5/2001 | Rennie et al. | |
| 6,241,055 B1 | 6/2001 | Daudi | |
| 6,241,056 B1 | 6/2001 | Cullen et al. | |
| 6,283,258 B1 | 9/2001 | Chen et al. | |
| 6,302,246 B1 | 10/2001 | Naumann et al. | |
| 6,357,557 B1 | 3/2002 | DiPonio | |
| 6,405,839 B1 | 6/2002 | Ballinger et al. | |
| 6,465,110 B1 | 10/2002 | Boss et al. | |
| 6,481,545 B1 | 11/2002 | Yano et al. | |
| 6,505,716 B1 | 1/2003 | Daudi et al. | |
| 6,507,716 B2 | 1/2003 | Nomura et al. | |
| 6,543,518 B1 | 4/2003 | Bend et al. | |
| 6,648,055 B1 | 11/2003 | Haug et al. | |
| 6,799,664 B1 | 10/2004 | Connolly | |
| 6,880,681 B2 | 4/2005 | Koizumi et al. | |
| 6,890,218 B2 | 5/2005 | Patwardhan et al. | |
| 6,899,158 B2 | 5/2005 | Matuura et al. | |
| 6,932,917 B2 | 8/2005 | Golden et al. | |
| 6,945,309 B2 | 9/2005 | Frait et al. | |
| 7,066,235 B2 | 6/2006 | Huang | |
| 7,112,749 B2 | 9/2006 | DiPaola et al. | |
| 7,178,795 B2 | 2/2007 | Huprikar et al. | |
| 7,293,755 B2 | 11/2007 | Miyahara et al. | |
| 7,594,568 B2 | 9/2009 | Hanna et al. | |
| 7,604,098 B2 | 10/2009 | Dessouki et al. | |
| 7,644,750 B2 * | 1/2010 | Schroth et al. | 164/100 |
| 7,775,332 B2 | 8/2010 | Hanna et al. | |
| 7,836,938 B2 | 11/2010 | Agarwal et al. | |
| 2002/0084156 A1 | 7/2002 | Ballinger et al. | |
| 2002/0104721 A1 | 8/2002 | Schaus et al. | |
| 2003/0037999 A1 | 2/2003 | Tanaka et al. | |
| 2003/0127297 A1 | 7/2003 | Smith et al. | |
| 2003/0141154 A1 | 7/2003 | Rancourt et al. | |
| 2003/0213658 A1 | 11/2003 | Baba | |
| 2004/0031581 A1 | 2/2004 | Herreid et al. | |
| 2004/0045692 A1 | 3/2004 | Redemske | |
| 2004/0074712 A1 | 4/2004 | Quaglia et al. | |
| 2004/0084260 A1 | 5/2004 | Hoyte et al. | |
| 2004/0242363 A1 | 12/2004 | Kohno et al. | |
| 2005/0011628 A1 | 1/2005 | Frait et al. | |
| 2005/0150222 A1 | 7/2005 | Kalish et al. | |
| 2005/0183909 A1 | 8/2005 | Rau, III et al. | |
| 2005/0193976 A1 | 9/2005 | Suzuki et al. | |
| 2006/0076200 A1 | 4/2006 | Dessouki et al. | |
| 2006/0243547 A1 | 11/2006 | Keller | |
| 2007/0039710 A1 | 2/2007 | Newcomb | |
| 2007/0056815 A1 | 3/2007 | Hanna et al. | |
| 2007/0062664 A1 | 3/2007 | Schroth et al. | |
| 2007/0062768 A1 | 3/2007 | Hanna et al. | |
| 2007/0142149 A1 | 6/2007 | Kleber | |
| 2007/0166425 A1 | 7/2007 | Utsugi | |
| 2007/0235270 A1 | 10/2007 | Miskinis et al. | |
| 2007/0298275 A1 | 12/2007 | Carter et al. | |
| 2008/0099289 A1 | 5/2008 | Hanna et al. | |
| 2008/0185249 A1 | 8/2008 | Schroth et al. | |
| 2009/0032569 A1 | 2/2009 | Sachdev et al. | |
| 2009/0107787 A1 | 4/2009 | Walker et al. | |

FOREIGN PATENT DOCUMENTS

| | | |
|---|---|---|
| CN | 2005/10113784 | 10/2005 |
| CN | 20051113784 A | 10/2005 |
| CN | 1757948 A | 4/2006 |
| CN | 2863313 Y | 1/2007 |
| DE | 1816256 U | 8/1960 |
| DE | 2214995 A1 | 10/1973 |
| DE | 24 46 938 | 4/1976 |
| DE | 2446938 A1 | 4/1976 |
| DE | 25 37 038 | 3/1977 |
| DE | 2537038 A1 | 3/1977 |
| DE | 19649919 A1 | 6/1998 |
| DE | 199 48 009 | 3/2001 |
| DE | 19948009 C1 | 3/2001 |
| DE | 60000008 T2 | 3/2002 |
| DE | 101 41 698 | 3/2003 |
| DE | 10141698 A1 | 3/2003 |
| DE | 102005048258.9 | 10/2005 |
| DE | 102005048258 A1 | 4/2006 |
| DE | 60116780 T2 | 11/2006 |
| DE | 102007013494 A1 | 9/2008 |
| EP | 0 205 713 | 12/1986 |
| EP | 0205713 A1 | 12/1986 |
| GB | 1230 274 | 4/1971 |
| GB | 1230274 | 4/1971 |
| GB | 2328952 | 3/1999 |
| JP | 57154533 | 9/1982 |
| JP | 57154533 A | 9/1982 |
| JP | 01-126434 | 8/1989 |
| JP | 05-104567 | 4/1993 |
| JP | 7167176 A | 7/1995 |
| JP | 11342461 A | 12/1999 |
| JP | 2001512763 T | 8/2001 |
| JP | 2003-214465 | 7/2003 |
| JP | 2004-011841 | 1/2004 |
| KR | 20010049837 A | 6/2001 |
| WO | 9823877 A1 | 6/1998 |
| WO | WO 98/23877 | 6/1998 |
| WO | 0136836 A1 | 5/2001 |
| WO | WO 01/36836 | 5/2001 |
| WO | 2007035206 A2 | 3/2007 |

OTHER PUBLICATIONS

Written Opinion for PCT/US2009/039839, Nov. 24, 2009, 4 pages.
Magnetorheological Fluid, retrieved from http://en.wikipedia.org/wiki/Magnetorheological_fluid, Nov. 6, 2007, 6 pages.
Hanna, et al., U.S. Appl. No. 11/440,916, filed May 25, 2006.
Hanna, et al., U.S. Appl. No. 11/475,756, filed Jun. 27, 2006.
Schroth, et al., U.S. Appl. No. 11/475,759, filed Jun. 27, 2006.
International Search Report dated Apr. 2, 2007 for International Application No. PCT US06/29687, Publication No. Wo 2007/040768; GM Global Technology Operations, Inc.
Omar Dessouki, George Drake, Brent Lowe, Wen Kuei Chang, General Motors Corp: Disc Brake Squeal: Diagnosis & Prevention. 03NVC-224; Society of Automotive Engineer, Inc. 2002.
Z. Wu, C. Richter, L. Menon, A Study of Anodization Process During Pore Formation in Nanoporous Alumina Templates, Journal of the Electrochemical Society, vol. 154, 2007.
W.-J. Lee, M. Alhoshan, W.H. Smyrl, Titanium Dioxide Nanotube Arrays Fabricated by Anodizing Processes, Journal of the Electrochemical Society, vol. 153, 2006, pp. B499-B505.
I.V. Sieber, P. Schmuki, Porous Tantalum Oxide Prepared by Electrochemical Anodic Oxidation, Journal of the Electrochemical Society, vol. 152, 2005, pp. C639-C644.

H. Tanaka, A. Shimada, A. Kinoshita, In situ Measurement of the Diameter of Nanopores in Silicon During Anodization in Hydrofluoric Acid Solution, Journal of the Electrochemic.

L.G. Hector, Jr., S. Sheu, Focused Energy Beam Work Roll Surface Texturing Science and Technology, Journal of Materials Processing & Manufacturing Science, vol. 2, Jul. 1993.

P.N. Anyalebechi, Ungrooved Mold Surface Topography Effects on Cast Subsurface Microstructure, Materials Processing Fundamentals, TMS 2007, pp. 49-62.

F. Yigit, Critical Wavelengths for Gap Nucleation in Solidification—Part 1: Theoretical Methodology, Journal of Applied Mechanics, vol. 67, Mar. 2000, pp. 66-76.

P.N. Anyalebechi, Undulatory Solid Shell Growth of Aluminum Alloy 3003 as a Function of the Wavelength of a Grooved Mold Surface Topography, TMS 2007, pp. 31-47.

Chinese First Office Action; CN200510113784.X; Dated May 18, 2007; 19 pages.

Chinese Second Office Action; CN200510113784.X; Dated Feb. 15, 2008; 13 pages.

German Examination Report; DE102005048258.9-12; Dated Oct. 22, 2007; 8 pages.

Gerdemann, Steven J,; Titanium Process Technologies; Advanced Materials & Processes, Jul. 2001, pp. 41-43.

Powder Metallurgy—Wikipedia article; http://en.wikipedia.org/wiki/Powder_metallurgy; 5 pages.

Sintering—Wikipedia article; http://en.wikipedia.org/wiki/Sintering; 2 pages.

PCT/US2008/087354 Written Opinion and Search Report; Date of Mailing: Aug. 3, 2009; 9 pages.

PCT/US2009/048424 Written Opinion and Search Report; Date of Mailing; Dec. 28, 2009; 7 pages.

U.S. Appl. No. 12/328,989, filed Dec. 5, 2008; First Named Inventor: Patrick J. Monsere.

U.S. Appl. No. 12/420,259, filed Apr. 8, 2009; First Named Inventor: Michael D. Hanna.

U.S. Appl. No. 12/434,057, filed May 1, 2009; First Named Inventor: Chongmin Kim.

U.S. Appl. No. 12/436,830, filed May 7, 2009; First Named Inventor: James G. Schroth.

U.S. Appl. No. 12/489,901, filed Jun. 23, 2009; First Named Inventor: Michael D. Hanna.

U.S. Appl. No. 12/885,813, filed Sep. 20, 2010; First Named Inventor: Michael D. Hanna.

German Office Action DE 112009 000948.4-12; dated Apr. 5, 2011; 4 pages.

* cited by examiner

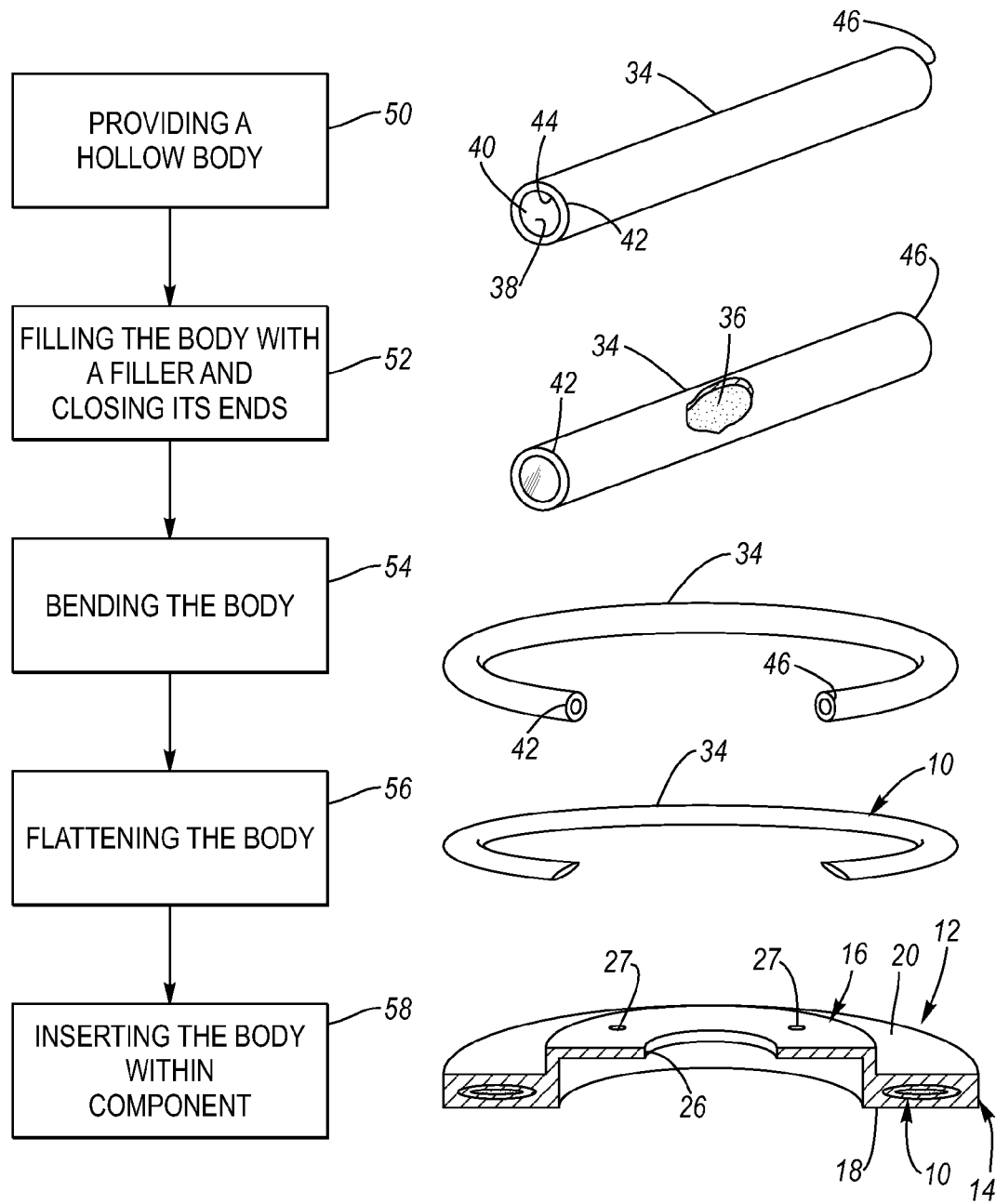

Title

INSERT WITH FILLER TO DAMPEN VIBRATING COMPONENTS

TECHNICAL FIELD

The field to which the disclosure generally relates includes products and methods used to help dampen vibrations in components, and inserts used with components to help dampen vibrations in the components.

BACKGROUND

Certain components are subjected to various vibrations or other oscillations when in use. Such vibrations could have adverse effects such as, among other things, generating noise, having increasing frequency amplitude, or having a prolonged period of vibration modes. Inserts may be used in the components to help dampen or otherwise dissipate the vibrations.

SUMMARY OF EXEMPLARY EMBODIMENTS OF THE INVENTION

One exemplary embodiment may include a product which may include an insert having a body that may define a cavity. The cavity may extend from a first end to a second end. The first end may be closed, and the second end may also be closed. A filler may be held in the cavity. Relative movement, among other things, between the body and the filler may help dampen vibrations and other oscillations in a component when the insert is carried by the component, and if and when the component is vibrated or otherwise oscillated.

Another exemplary embodiment may include a product which may include a component and at least one insert. The component may be manufactured by a casting process. The at least one insert may be carried at least partially within the component. The at least one insert may have a body which may define a cavity, and a filler may be held in the cavity. The at least one insert may help dampen vibrations and other oscillations in the component if and when the component is subjected to vibrations or other oscillations.

Another exemplary embodiment may include a method of making a product. The method may include providing a body that is hollow and at least partially filling the body with a filler. The method may also include closing the ends of the body to define a cavity to thus trap the filler within the body, and may further include inserting the body at least partially within a component.

Another exemplary embodiment may include a product which may include a brake rotor. The brake rotor may include a cheek portion, a hub portion, and an insert. The hub portion may extend from the cheek portion. The cheek portion may be formed by being cast over the insert so that the insert is bounded on all sides by the cheek portion. The insert may have a body that extends from a first end that is closed to a second end that is also closed. A cavity may be defined between the first end and the second end, and a filler may be held within the cavity to help dampen vibrations or other oscillations in the brake rotor. The filler may be composed of a first material and the body may be composed of a second material, and the first material may have a lower melting temperature than that of the second material.

Another exemplary embodiment may include a method including providing a self-contained dampening component, and solidifying a material over or around at least a portion of the self-contained dampening component to provide a solidified body portion. In select exemplary embodiments, the solidified body portion includes at least one of a metal, an alloy, or any suitable type of material.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 2 is a schematic showing one embodiment of a method of making a component with an insert.

DETAILED DESCRIPTION OF EXEMPLARY EMBODIMENTS

Figure 1:
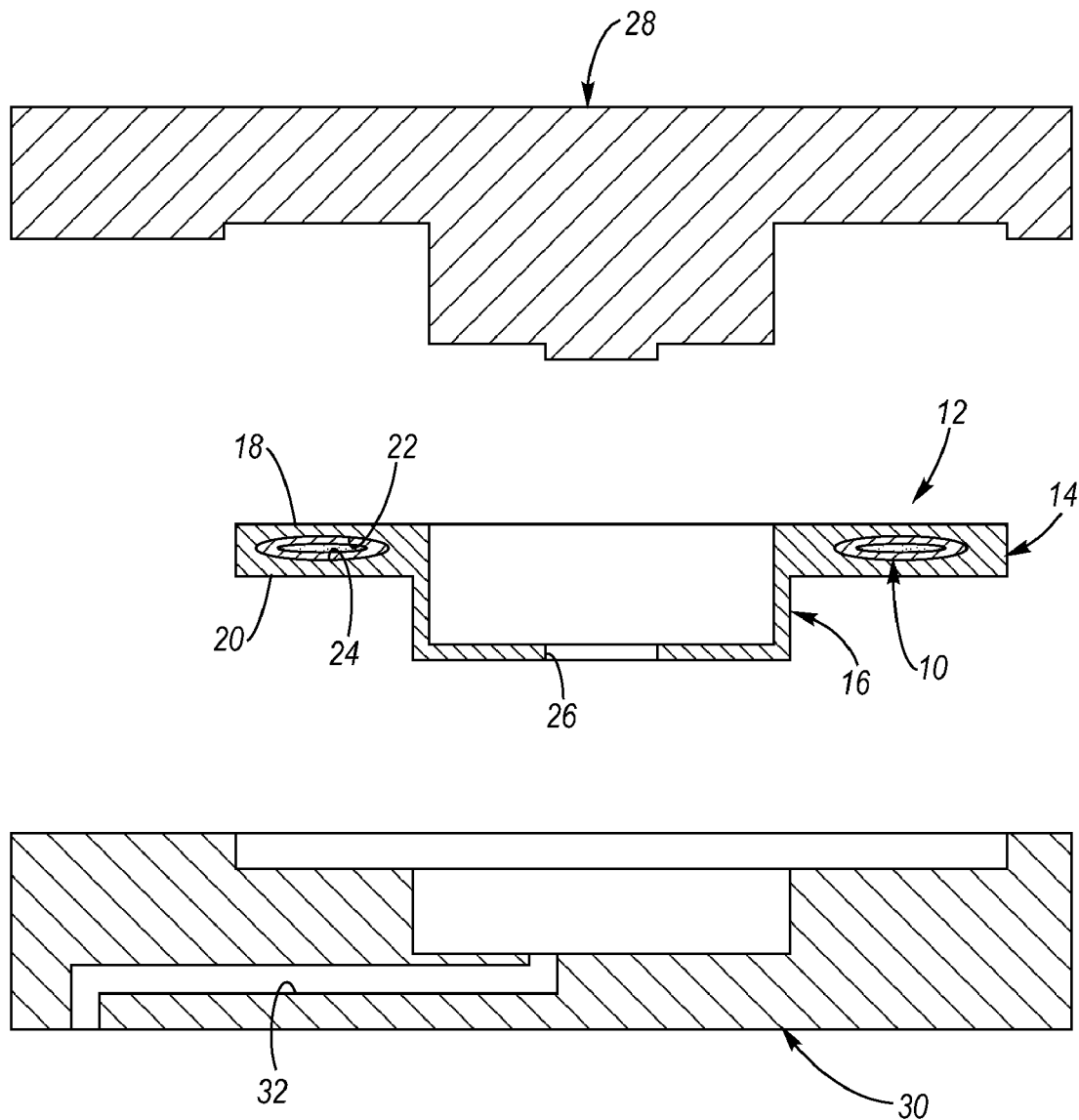
FIG. 1 is a sectional view of one embodiment of a component being cast with an insert.

The following description of the embodiment(s) is merely exemplary (illustrative) in nature and is in no way intended to limit the invention, its application, or uses.

The figures illustrate a component, such as an automotive component, that has an insert 10 to help dampen or otherwise dissipate vibrations or other oscillations in the component. The automotive component may be any component in an automobile that may be subjected to vibrations such as a brake rotor 12, an electrical motor, a transmission housing, an exhaust manifold, a cylinder head, brackets, or the like. Other components may include non-automotive applications including, but not limited to, sporting equipment, housing appliances, manufacturing equipment such as lathes, milling/grinding/drilling machines, or other components subjected to vibrations. These components may be manufactured by a number of different manufacturing processes including, but not limited to, casting, machining, injection molding, or any other suitable process. In the embodiment shown, the brake rotor 12 may be subjected to vibrations when a pair of pads is forced against the brake rotor by a caliper in order to generate friction that slows or stops the associated automobile.

The brake rotor 12 may be of the solid-type as shown, may be of the vented-type (not shown) having a plurality of vanes, or may be another type. Referring to FIG. 1, the brake rotor 12 may include a cheek portion 14 and a hub portion 16 extending from the cheek portion. The cheek portion 14 may include a first cheek face 18 and an opposite second cheek face 20 that each or together constitute braking or friction surfaces of the brake rotor 12. In this embodiment, the cheek portion 14 may also have a first inner face 22 and an opposing second inner face 24. All of the faces 18, 20, 22, and 24 may extend continuously around a circumference of the brake rotor 12. The hub portion 16 may extend axially from the cheek portion 14, and may define a central aperture 26 and may define a plurality of bolt holes 27.

The brake rotor 12 may be made by a casting process in order to make the one-piece brake rotor. In select exemplary embodiments, the brake rotor 12 may be made from iron, titanium, aluminum, magnesium, steel, or any of a variety of other alloys or metal matrix composites. As will be appreciated by skilled artisans, the exact casting process used, including the number of steps, the order of steps, the parameters in each step, and the like may vary between particular components. For instance, the casting process may be a vertical or horizontal process, and may be a sand casting process. As one example, a cast molding machine may include a first mold half 28 and a second mold half 30 that, when closed, form a cavity that defines the shape of the brake rotor 12. In short, a molten material runs through a channel 32 and into the cavity, and then solidifies to form the brake rotor 12.

The insert 10 may be used with a component to help dampen vibrations and other oscillations in the component when the component is vibrated or otherwise oscillated. For example, the insert 10 may help dissipate vibrations, oscillations, and other associated effects in the component through energy absorption. When the component is vibrated, relative sliding and other movement at an interface formed between a body 34 and a filler 36 of the insert 10 absorbs energy, such as vibrations, that consequently dampens the vibrations. In the case where the filler 36 is a solid, energy is absorbed by the relative sliding and other movement between the body 34 and the filler to generate friction that may consequently dampen the vibrations. Alternatively, the insert 10 may be a self-contained dampening device; that is, the insert 10 absorbs energy and dampens vibrations in and of itself and independently of the particular component in which it is inserted. In this example, the insert 10 may dampen itself without having to cooperate with the remainder of the device, or the insert may cooperate with the remainder of the device so that the movement of the insert against the remainder of the device dampens and the insert itself dampens.

The insert 10 may have various shapes, sizes, and numbers other than those shown in order to accommodate different components. For example, several rectangular inserts may be inserted at separate locations in a component in order to dampen vibrations at those locations. The insert 10 may be bonded to the body portion of a product or to the cheek portion 14, or may be free to move. In select embodiments, the bonding may be accomplished by, for example, metal casting, welding, adhesive bonding, fastening, or injection molding. FIG. 2 shows one example for use with the brake rotor 12 where the insert 10 has a generally tubular or cylindrical shape that is eventually formed into an open ring shape having a generally oval cross-sectional profile. When in use, the insert 10 may be located completely within and bounded by the particular automotive component, such as is shown in the example brake rotor 12. In other examples, the insert 10 may be only partially located within the automotive component, or otherwise be exposed out of the automotive component and still dampen vibrations. That is, an outside surface of the insert 10 may be exposed and may be flush with an outside surface of a component where the insert would be an inlay.

The body 34 may form the outer structure of the insert 10 and may encase the filler 36. In the example shown, the body 34 may completely enclose the filler 36. The body 34 may be composed of various materials including cast iron, gray cast iron, aluminum, magnesium, steel, stainless steel, and any other variety of other alloys or metal matrix composites. The body 34 may define a cavity 38 having an inner surface 40 to hold the filler 36 therein. The cavity 38 may extend from a first end 42 which defines a first opening 44 to a second end 46 which defines a second opening (not shown). The first and second openings may be closed to seal the filler 36 within the cavity 38 by various techniques including stamping, plugging, welding, or the like.

In some embodiments, the inner surface 40 may be coated to facilitate energy absorption between the body 34 and the filler 36 and to thus help dampen vibrations. Suitable coatings may include a plurality of particles which may be bonded to each other and/or to the inner surface 40 or to the outer surface of the filler 36 (in the case of a solid filler) by an inorganic binder, an organic binder, or another suitable bonding material. Suitable binders may include epoxy resins, phosphoric acid binding agents, calcium aluminates, sodium silicates, wood flour, or clays. In one embodiment, the coating may be deposited on the inner surface 40 or to the outer surface of the filler 36 as a liquid dispersed mixture of alumina-silicate-based, organically bonded refractory mix. In other embodiments, the coating may include at least one of alumina or silica particles, mixed with a lignosulfonate binder, cristobalite ($SiO_2$), quartz, or calcium lignosulfonate. The calcium lignosulfonate may serve as a binder. In one embodiment, the coating may include any types of coating used in coating casting ladles or vessels, such as IronKote or Ladlekote type coatings. In one embodiment, a liquid coating may be deposited on a portion of the inner surface 40 or on the outer surface of the filler 36, and may include high temperature Ladlekote 310B. In another embodiment, the coating may include at least one of clay, $Al_2O_3$, $SiO_2$, a graphite and clay mixture, silicon carbide, silicon nitride, cordierite (magnesium-iron-aluminum silicate), mullite (aluminum silicate), zirconia (zirconium oxide), or phyllosilicates. In one embodiment, the coating may comprise a fiber such as ceramic or mineral fibers.

The exact thickness of the coating may vary and may be dictated by, among other things, the materials used for the body 34 or the filler 36 or both, and the desired degree of vibration damping. Examples of thicknesses may range from about 1 μm-400 μm, 10 μm-400 μm, 30 μm-300 μm, 30 μm-40 μm, 40 μm-100 μm, 100 μm-120 μm, 120 μm-200 μm, 200 μm-300 μm, 200 μm-550 μm, or variations of these ranges.

In one embodiment, the coating may be deposited on at least one outer surface of the insert 10.

The filler 36 may provide an opposing matter that moves against or otherwise contacts the inner surface 40 of the body 34 when the particular component is vibrated. The filler 36 may fill the cavity 38 completely or may only partially fill the cavity. The filler 36 may be composed of a matter that absorbs energy with the body 34 and may be composed of a metal, a metal alloy, a polymer, a ceramic, a plastic, a powdered material; or may be a solid which can convert into a liquid with the application of heat such as gallium, a paraffin wax, or the like; or may be a liquid which can convert into a solid with the application of a magnetic field such as a magnetorheological (MR) fluid, or with the application of an electric field such as an electrorheological (ER) fluid.

In at least one embodiment, the filler 36 may be composed of a first material, while the body 34 may be composed of a second material that has a higher melting temperature than the first material, and the automotive component may be composed of a third material that has a lower melting temperature than the second material. This relationship enables the filler 36 to be composed of a matter having a lower melting temperature than that of the component in which the insert 10 is used. Such matter may, in some cases, exhibit better dampening characteristics as compared to other matter with higher melting temperatures, and the lower melting temperature matter would otherwise melt when the component is being cast. For example, the filler may be composed of a magnetorheological fluid, the component such as the brake rotor 12 may be composed of a cast iron having a melting temperature of about 2700° F. (1482° C.), and the body 34 may be composed of a steel having a higher melting temperature than that of the brake rotor 12. This means that the molten cast iron may be poured over the steel body without melting the body and thus melting the magnetorheological filler. In this way, the body 34 protects the filler 36.

FIG. 2 shows one example of a method that may be used to manufacture the insert 10 and insert it into the brake rotor 12. Skilled artisans will appreciate that the exact method including the number of steps, the order of steps, the parameters within each step, and the like may vary and may be dictated by such factors as the materials used, the size and shape of the insert, and the size and shape of the component. In this example, the method may include several steps. At a step 50, the body 34 may be provided as an elongated hollow body that may be formed by casting, machining, or the like. In a step 52, the body 34 and the cavity 38 may be filled with the filler 36, and the first and second openings may be closed. Here, the body 34 may be completely or partially filled with the filler 36. In a step 54, the body 34 may be bent into a desired shape such as the open ring shape shown here; in some embodiments, this step may not be needed. Skilled artisans will know suitable bending processes such as the roll-type bending process. In a step 56, the body 34 may be at least partially flattened so that the body will fit in the component. Here, the body 34 may be flattened to have an oval shape in cross-sectional profile so that the insert 10 can fit in the cheek portion 14 of the brake rotor 12; in some embodiments, this step may not be needed. Skilled artisans will know suitable flattening processes including a stamping process, a pressing process, and the like. In a step 58, the body 34 is inserted into the component. Here, the insert 10 may be cast-in-place to be completely within and completely bounded by the cheek portion 14 of the brake rotor 12. Such cast-in-place processes may be performed by using locating pins, clamps, magnets, and the like to suspend and position the insert 10 within the cheek portion 14.

Other embodiments of the insert 10 and of the method of making the insert and inserting it into components exist that may not have been shown or described. For example, and as mentioned, the insert 10 may have a straight shape or otherwise noncurved shape where the step 54 of bending need not be performed. Also, as mentioned, the insert 10 may have a smaller shape than shown where more than one insert may be inserted into the particular component at various places which may be subjected to vibration. In another example, the insert 10 may be welded to be inserted into the component. Taking the brake rotor 12 as the example, the brake rotor may have a first half that is cast to expose the first inner face 22, and may have a second half that is cast to expose the second inner face 24. The insert 10 may be placed between the inner faces 22, 24, and the first and second halves may then be welded or otherwise fastened together in order to enclose the insert 10.

The above description of embodiments of the invention is merely exemplary in nature and, thus, variations thereof are not to be regarded as a departure from the spirit and scope of the invention.

What is claimed is:

1. A method of making a product, the method comprising:
providing a body that is hollow between a first end and a second end;
at least partially filling the body with a filler;
closing the first end and the second end to define a cavity and to trap the filler within the body; and
inserting the body at least partially within a component, wherein the filler comprises a first material, the body comprises a second material, and the first material has a lower melting temperature than the second material.

2. A method as set forth in claim 1 further comprising:
bending the body to form a generally open ring shape; and
flattening the body to form, in cross-sectional profile, a generally oval shape.

3. A method as set forth in claim 1 wherein the inserting further comprises casting the component over the body so that the body is bounded on all sides by the component.

4. A method as set forth in claim 1 wherein the inserting further comprises welding the body within the component.

5. A method as set forth in claim 1 further comprising providing the filler comprising a first material, and providing the component comprising a third material, the first material having a lower melting temperature than the third material.

6. A method as set forth in claim 1 wherein the filling further comprises filling the body completely with the filler.

7. A method comprising:
providing a self-contained dampening device for a body portion of a component; and
inserting the self-contained dampening device in the body portion to dampen the component, wherein movement within the self-contained dampening device itself and separate from the body portion dampens vibrations in the component.

8. A method as set forth in claim 7 wherein the self-contained dampening device is free to move in the body portion so that movement in the body portion also dampens the component.

9. A method as set forth in claim 7 wherein the self-contained dampening device is bonded to the body portion.

10. A method of making a product, the method comprising:
providing a body that is hollow between a first end and a second end;
at least partially filling the body with a filler;
closing the first end and the second end to define a cavity and to trap the filler within the body; and
inserting the body at least partially within a component, wherein the filler comprises a first material, the component comprises a second material, and the first material has a lower melting temperature than the second material.

11. A method comprising:
inserting a self-container dampening component in another component subject to vibration, the self-contained dampening component comprising a body having a cavity therein and a filler contained in the cavity and constructed and arranged so that relative movement between the body and the filler damps the self-contained dampening component upon vibration thereof.

12. A method as set forth in claim 11 wherein the filler comprises a solid.

13. A method as set forth in claim 11 wherein the filler comprises a liquid.

14. A method comprising:
providing a self-container dampening component in another component subject to vibration, the self-contained dampening component comprising a body having a cavity therein and a filler contained in the cavity and constructed and arranged so that relative movement between the body and the filler damps the self-contained dampening component upon vibration thereof,
casting at least a portion of another component around at least a portion of the self-contained dampening component.

15. A method as set forth in claim 14 wherein the filler comprises a solid.

16. A method as set forth in claim 14 wherein the filler comprises a liquid.

17. A method of making a product comprising:
providing a self-contained dampening component comprising a body having a cavity defined therein and an opening in the body communicating with the cavity;

deposing a filler in the cavity through the opening and closing the opening;
inserting the self-container dampening component in another component subject to vibration so relative movement between the body and the filler damps said another component upon vibration thereof.

* * * * *